United States Patent
Tai (10) Patent No.: US 9,739,261 B2
(45) Date of Patent: Aug. 22, 2017

(54) POWER GENERATION DEVICE

(71) Applicant: Sheng-Chu Tai, Kaohsiung (TW)

(72) Inventor: Sheng-Chu Tai, Kaohsiung (TW)

( * ) Notice: Subject to any disclaimer, the term of this patent is extended or adjusted under 35 U.S.C. 154(b) by 581 days.

(21) Appl. No.: 14/390,119

(22) PCT Filed: Nov. 23, 2012

(86) PCT No.: PCT/CN2012/085156
§ 371 (c)(1),
(2) Date: Oct. 2, 2014

(87) PCT Pub. No.: WO2014/079041
PCT Pub. Date: May 30, 2014

(65) Prior Publication Data
US 2015/0037151 A1    Feb. 5, 2015

(51) Int. Cl.
F03D 3/06    (2006.01)
F03D 7/02    (2006.01)
F03D 7/04    (2006.01)

(52) U.S. Cl.
CPC ........... *F03D 3/068* (2013.01); *F03D 7/0208* (2013.01); *F03D 7/04* (2013.01);
(Continued)

(58) Field of Classification Search
CPC .......... F03D 3/068; F03D 7/0208; F03D 7/04; F03D 3/067; F03D 7/06; F03D 7/0212;
(Continued)

(56) References Cited

U.S. PATENT DOCUMENTS 8,035,245 B1 * 10/2011 Simnacher .............. F03D 3/068
290/44
2003/0161729 A1 * 8/2003 Lindhorn ................ F03D 3/067
416/117
(Continued)

FOREIGN PATENT DOCUMENTS

CN    2777232    5/2006
CN    101205870 A    6/2008
(Continued)

OTHER PUBLICATIONS

International Search Report for PCT/CN12/85156 dated Aug. 29, 2013.
(Continued)

*Primary Examiner* — Craig Kim
*Assistant Examiner* — Michael Sehn
(74) *Attorney, Agent, or Firm* — WPAT, P.C., Intellectual Property Attorneys; Anthony King (57) ABSTRACT

Disclosed is a power generation device (1), comprising a shaft column (11) and at least two blade units (12-17), wherein the blade units (12-17) are sheathed onto the shaft column (11) and capable of rotating around the shaft column (11), the adjacent blade units rotate in opposite rotational directions, each blade unit (12-17) has a plurality of arm portions (121-171) and a plurality of movable blades (122-172), the arm portions (121-171) extend radially outwardly from the shaft column (11), each of the movable blades is connected to one side of the corresponding arm portion and, after passing through a first radial center line (19) of the shaft column (11), expands gradually, and after being expanded, does not interfere with the adjacent blade unit, the first radial center line (19) is parallel to a fluid flow direction, and each of the movable blades is gradually closed after it rotates through a rotation angle. The power generation
(Continued)

device (1) can maximize the use of energy in the fluid so as to improve power generation efficiency.

11 Claims, 8 Drawing Sheets

(52) U.S. Cl.
CPC ... *F05B 2240/218* (2013.01); *F05B 2240/511* (2013.01); *Y02E 10/74* (2013.01)

(58) Field of Classification Search
CPC .............. F03D 7/0216; F05B 2240/218; F05B 2240/511
See application file for complete search history.

(56) References Cited

U.S. PATENT DOCUMENTS

| | | | |
|---|---|---|---|
| 2010/0096854 A1* | 4/2010 | Paluszek | F03D 3/067 290/44 |
| 2011/0133474 A1* | 6/2011 | Haar | F03D 3/06 290/55 |
| 2011/0211960 A1* | 9/2011 | Nguyen | F03D 3/067 416/147 |
| 2011/0272948 A1* | 11/2011 | Stephens | F03D 3/0427 290/55 |
| 2012/0049534 A1 | 3/2012 | Kikuchi | |

FOREIGN PATENT DOCUMENTS

| | | |
|---|---|---|
| CN | 101493071 A | 7/2009 |
| CN | 201351575 Y | 11/2009 |
| CN | 201412270 Y | 2/2010 |
| CN | 101725477 A | 6/2010 |
| JP | 9-60573 | 3/1997 |

OTHER PUBLICATIONS

English summary of the International Search Report for PCT/CN12/85156 dated Aug. 29, 2013.

* cited by examiner

POWER GENERATION DEVICE

FIELD

The disclosure relates to a power generation device, more particular to a rotary-type power generation device.

BACKGROUND

Surface air after heating induces air flows to generate wind, and a wind power generator is an apparatus for converting wind power into electric power. The technique of conventional wind power generator includes horizontal-axis wind power generators and vertical-axis wind power generators.

However, for both the horizontal-axis wind power generators and the vertical-axis wind power generators, in order to achieve high efficiency of wind power generation, increasing the blade windward area is generally an important means, thus the size of the blade gets big. In order to reduce the weight of the big blade, in the prior art, polymer composites are used as raw materials to form an integrated big blade through molding. To ensure the strength of the blade, in the prior art, a large and bulky mold needs to be used in the process for molding the big blade, so as to obtain an integrated complete single blade.

Additionally, a conventional vertical wind power generator has a great disadvantage that the conventional wind power generator can merely receive the wind on the blade at one side, that is, the degree of utilization of the windward region of the blade of the conventional wind power generator is considerable low, and wind energy cannot be effectively used, so the power generation efficiency is low.

Therefore, it is necessary to provide a power generation device, to solve the foregoing problem.

SUMMARY OF THE INVENTION

The aim of the present invention is providing a power generation device, which can significantly increase the fluid-receiving region, thereby maximizing the use of energy in the fluid so as to improve power generation efficiency.

The present invention provides a power generation device, which includes a shaft column and at least two blade units. The blade units are sheathed onto the shaft column and capable of rotating around the shaft column. The adjacent blade units rotate in opposite rotational directions. Each blade unit has a plurality of arm portions and a plurality of movable blades. The arm portions extend radially outwardly from the shaft column. Each of the movable blades is connected to one side of the corresponding arm portion and, after passing through a first radial centre line of the shaft column, expands gradually, and after being expanded, does not interfere with the adjacent blade unit. The first radial centre line is parallel to a fluid flow direction. Each of the movable blades is gradually closed after it rotates through a rotation angle.

As for the adjacent blade units rotating reversely around the shaft column, the expanded movable blades form an almost continuous fluid-receiving region at two sides of the shaft column, thus significantly increasing the fluid-receiving region, and maximizing the use of energy in the fluid. Compared with a conventional power generation device (for example a wind power generation device) that merely has a fluid-receiving region at one side, the power generation device of the present invention can improve the power generation efficiency by several times in compulsion with the conventional power generation device.

DETAILED DESCRIPTION OF THE INVENTION

Figure 1:
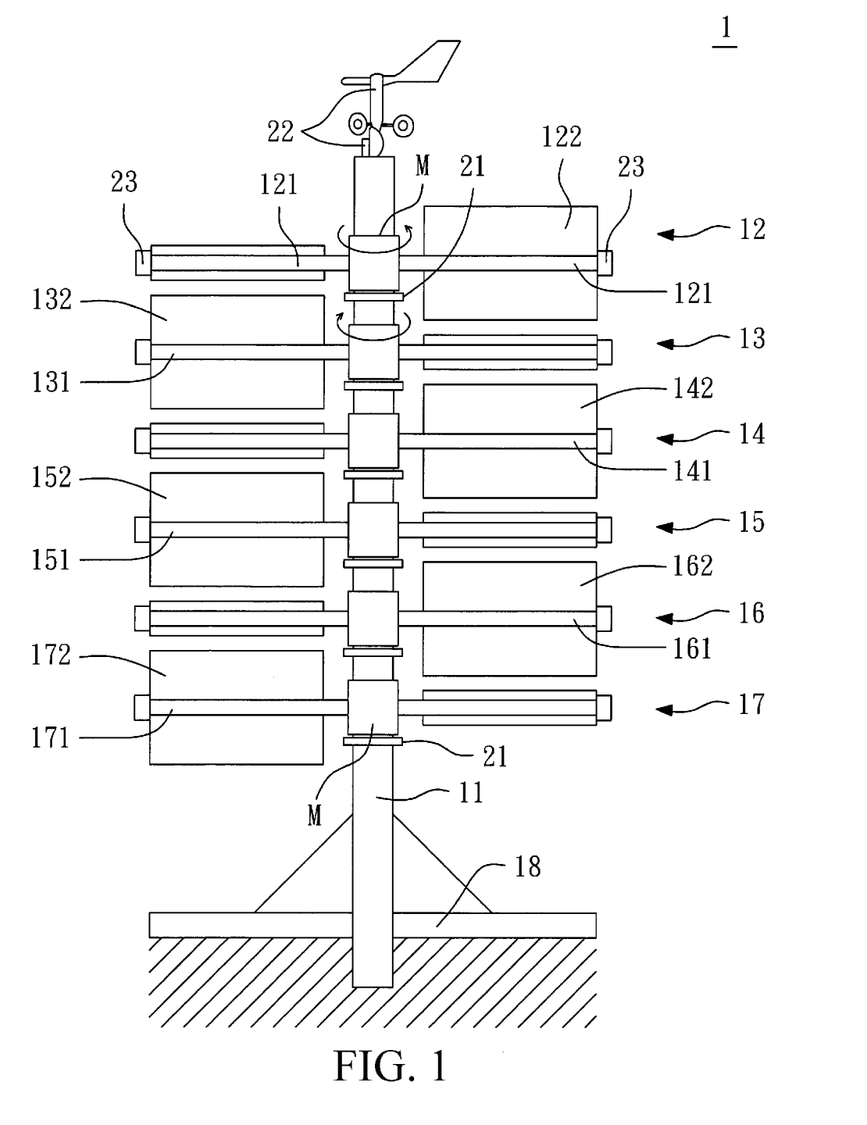
FIG. 1 is a schematic diagram of a power generation device according to an embodiment of the present invention.

FIG. 1 is a schematic diagram of a power generation device according to an embodiment of the present invention. Referring to FIG. 1, the power generation device of the present invention includes a shaft column and at least two blade units. In the embodiment shown in FIG. 1, the fluid used for power generation is a gas (such as wind), and it should be understood that, in other applications, the fluid used for power generation can be a liquid, but not limited thereto.

The power generation device 1 includes a shaft column 11 and six blade units 12-17. The shaft column 11 is fixed on a base 18. The blade units 12-17 are sheathed onto the shaft column 11 and capable of rotating around the shaft column 11. In this embodiment, adjacent blade units rotate in opposite rotational directions, for example, adjacent blade units 12 and 13 rotate around the shaft column 11 in opposite rotational directions, adjacent blade units 13 and 14 rotate around the shaft column 11 in opposite rotational directions . . . , and adjacent blade units 16 and 17 rotate around the shaft column 11 in opposite rotational directions. In this embodiment, the blade units 12-17 respectively have a magnetic shaft sleeve M, the magnetic shaft sleeves M are sheathed onto the shaft column 11 at intervals, and the blade units 12-17 respectively rotate around the shaft column 11 through the magnetic shaft sleeves M, but not limited thereto.

In this embodiment, the blade units 12-17 have the same structure, so merely the blade unit 12 is taken as an example for illustration, and other blade units 13-17 are not described herein again.

FIGS. 2a to 2d are top views of an operating process of a blade unit of a power generation device according to an embodiment of the present invention. Referring to FIG. 1 and FIGS. 2a to 2d, the blade unit 12 has a plurality of arm portions 121 and a plurality of movable blades 122, where the arm portions 121 extend radially outwardly from the shaft column 11, one end of each arm portion 121 is fixed on the magnetic shaft sleeve M, and each of the movable blades 122 is connected to one side of the corresponding arm portion 121.

Each movable blade 122 passes through a first radial centre line 19 of the shaft column 11 and then is gradually expanded along an expansion direction (a direction perpendicular to the paper surface in FIGS. 2a to 2d), where the expansion direction is substantially perpendicular to the first radial centre line 19, and the first radial centre line 19 is parallel to a fluid flow direction W. However, the expanded movable blade 122 does not interfere with the adjacent blade unit 13. Relative to the first radial centre line 19, each of movable blades 122 is gradually closed after it rotates through a rotation angle.

Referring to FIG. 1 again, in order to prevent the blade units 12-17 from being stacked together due to the influence of gravity and avoid occurrence of mutual friction upon rotation, in this embodiment, the power generation device 1 further includes a plurality of magnetic components 21, and each magnetic component 21 is disposed between the magnetic shaft sleeves M, and the magnetic components 2 have the magnetism the same as that of the magnetic shaft sleeves M, so as to utilize the maglev effects generated due to the principle of like magnetism repulsion to allow the magnetic shaft sleeves M to be separated from each other, thereby preventing stacking and mutual friction of the blade units 12-17.

It should be noted that, each blade unit of the power generation device of the present invention may have two, three, four, five or more sets of arm portions and movable blades. In this embodiment, the blade unit 12 of the power generation device 1 have four sets of arm portions 121 and movable blades 122 and 122' (as shown in FIGS. 2a to 2d).

Figure 2A:
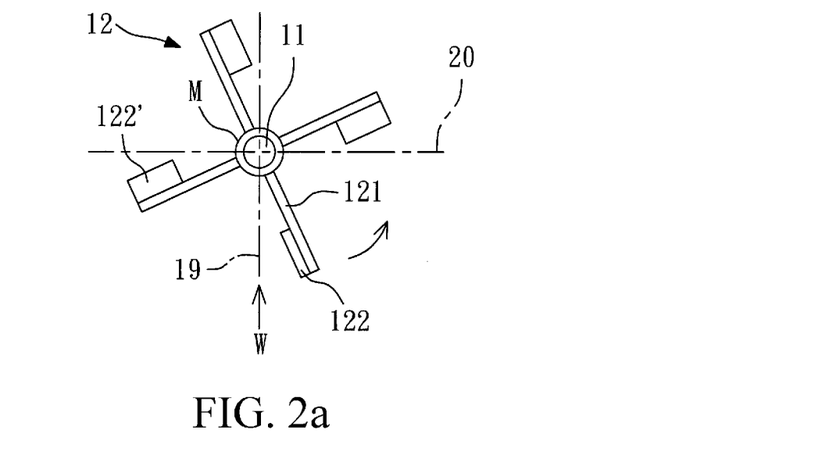
FIGS. 2a to 2d are top views of an operating process of a blade unit of a power generation device according to an embodiment of the present invention.
Figure 2B:
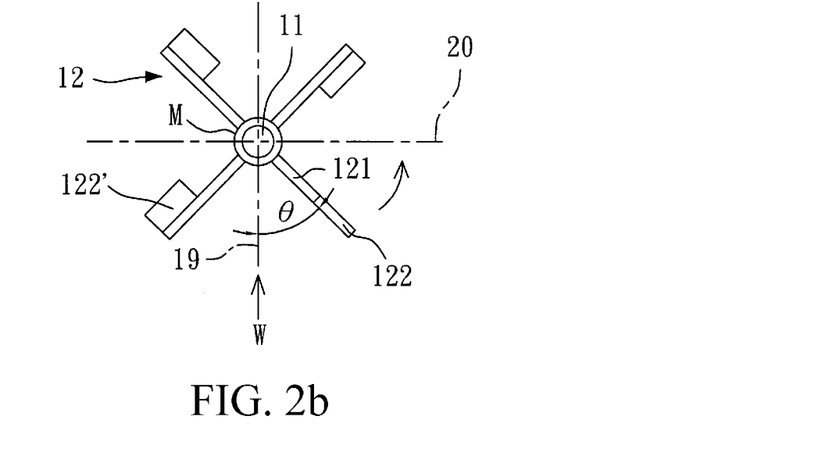
Figure 2C:
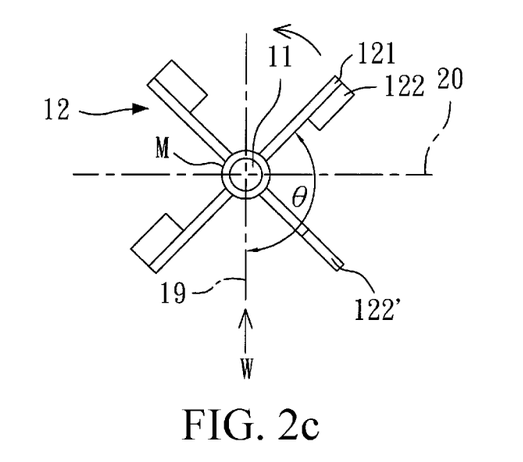
Figure 2D:
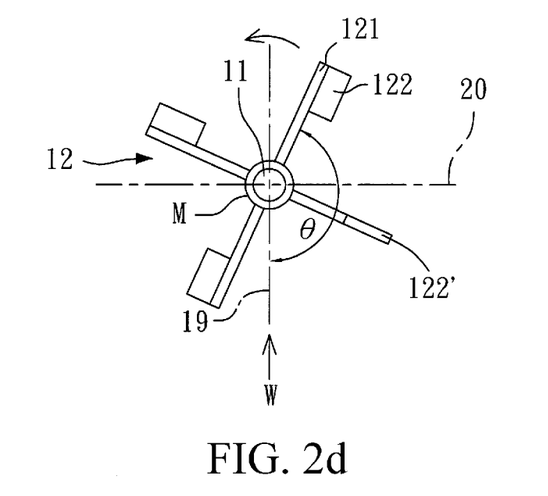

After a movable blade 122 passes through the first radial centre line 19, the movable blade 122 starts to be gradually expanded (as shown in FIG. 2a) to increase the fluid-receiving area. Preferably, the movable blade 122 is fully expanded before the rotation angle θ gets to be 45 degrees (as shown in FIG. 2b), so that the subsequent fluid-receiving area continues to be the maximum. When the rotation angle θ approaches 135 degrees [the movable blade 122 and the adjacent movable blade 122' (the next movable blade that passes through the first radial centre line 19) are symmetrical about a second radial centre line 20 of the shaft column 11], the movable blade 122 beings to be gradually closed (as shown in FIG. 2c and FIG. 2d), because at this time the next movable blade 122' has blocked the fluid-receiving path of the movable blade 122, and the movable blade 122 almost cannot receive the fluid power; moreover, if the movable blade 122 is maintained at the expanded state at this time, resistance is generated and the energy generation efficiency is reduced.

Therefore, preferably, when the arm portions where the movable blade 122 and the adjacent movable blade 122' are located are symmetric to the second radial centre line 20 of the shaft column 11, the movable blade 122 is closed.

In the following FIG. 3 to FIG. 5, the blade unit 12 mentioned above and the component symbols thereof are taken as an example to illustrate the time point of closure of a movable blade of a blade unit having different sets of arm portions and movable blades.

Figure 3:
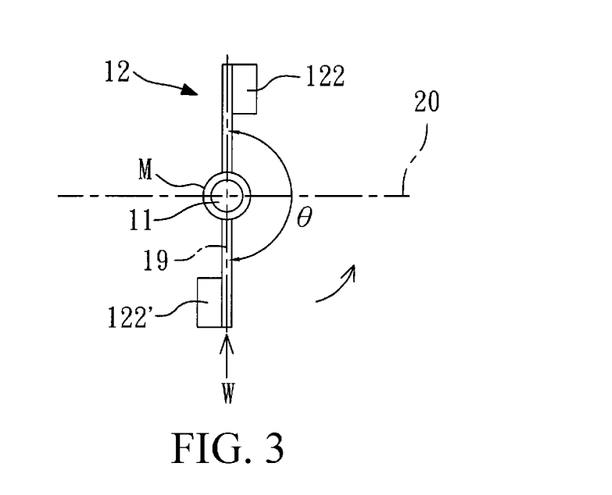
FIGS. 3 to 5 are schematic diagrams of time point of fully closure of a movable blade of a blade unit having different sets of arm portions and movable blades according to an embodiment of the present invention.
Figure 4:
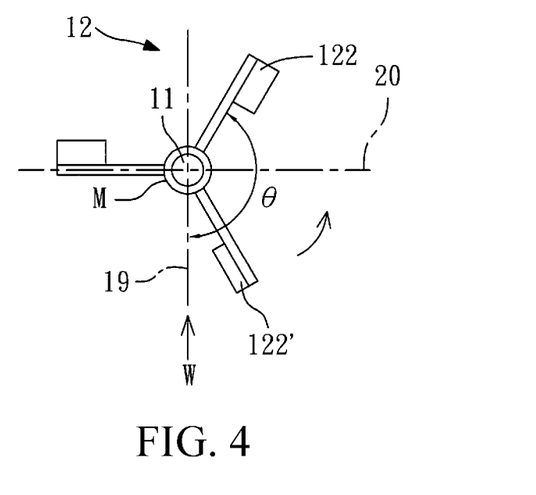
Figure 5:
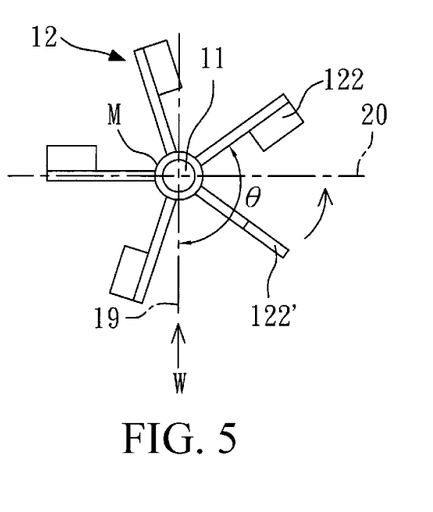

FIGS. 3 to 5 are schematic diagrams of time point of fully closure of a movable blade of a blade unit having different sets of arm portions and movable blades according to an embodiment of the present invention. Referring to FIG. 3, each blade unit 12 has two sets of arm portions 121 and movable blades 122. Preferably, when the rotation angle θ is 180 degrees, the movable blade 122 is fully closed. Referring to FIG. 4, each blade unit 12 has three sets of arm portions 121 and movable blades 122. Preferably, when the rotation angle θ is 150 degrees (that is, the included angle of the first radial centre line 19 and the second radial centre line 20 of 90°+a half of the included angle of the arm portions where movable blade 122 and the adjacent movable blade 122' are located of 60°), the movable blade 122 begins to be closed, and is fully closed before the rotation angle θ gets to be 180 degrees. Referring to FIG. 5, each blade unit 12 has five sets of arm portions 121 and movable blades 122. Preferably, when the rotation angle θ is 126 degrees (that is, the included angle of the first radial centre line 19 and the second radial centre line 20 of 90°+a half of the included angle of the arm portions where movable blade 122 and the adjacent movable blade 122' are located of 36°), the movable blade 122 begins to be closed, and is fully closed before the rotation angle θ gets to be 180 degrees. As for other blade units having different sets of arm portions and movable blades, the time point of closure of the movable blade can be deduced by analogy.

When a movable blade 122 begins to be expanded to a rotation angle θ of less than 90 degrees (as shown in FIGS. 2a and 2b), due to the fluid blocked by the movable blade 122, each movable blade 122 can generate a large rotational torque, thereby generating great energy.

Figure 6:
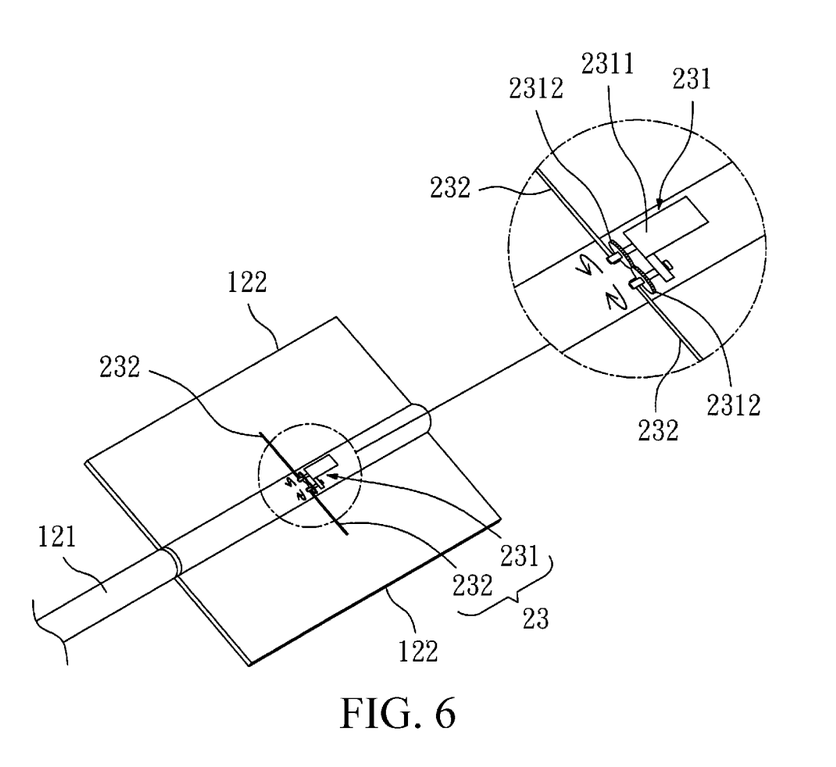
FIG. 6 and FIG. 7 are schematic diagrams of a blade unit equipped with a drive unit according to an embodiment of the present invention.
Figure 7:
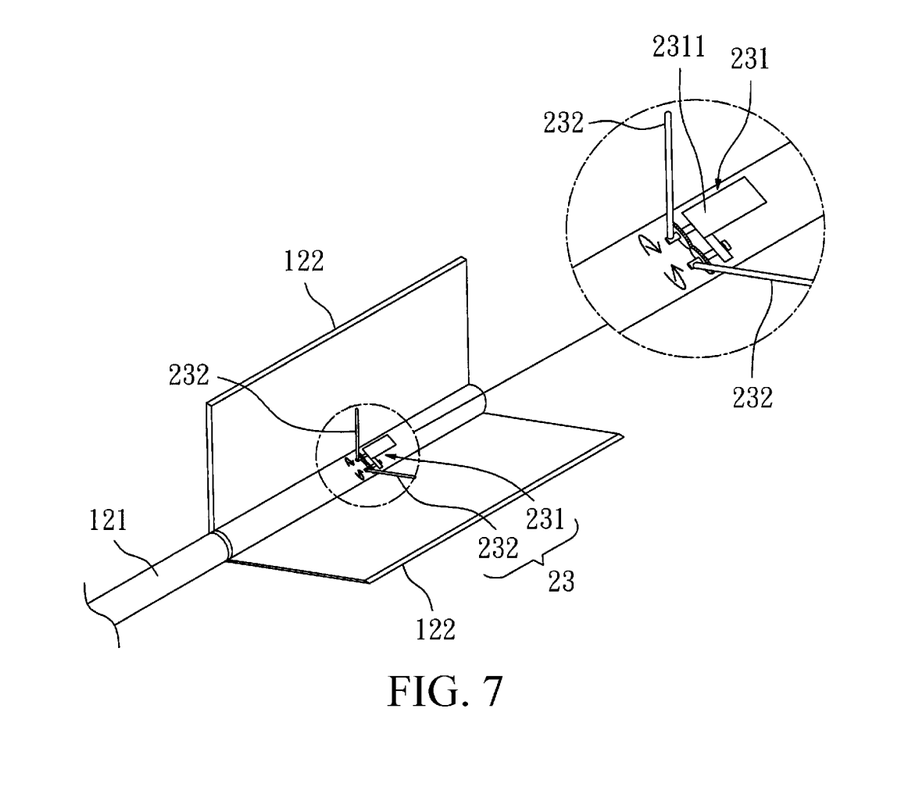

FIG. 6 and FIG. 7 are schematic diagrams of a blade unit equipped with a drive unit according to an embodiment of the present invention. Referring to FIG. 1, FIG. 6 and FIG. 7, in this embodiment, the power generation device 1 further includes at least one sensing unit 22 and a plurality of drive units 23. The sensing unit 22 is disposed on the shaft column 11, and preferably, the sensing unit 22 is disposed at the top of the shaft column 11 (but not limited thereto) for measuring the fluid flow direction, the fluid flow rate and the position of the movable blade 122. In this embodiment, each drive unit 23 is disposed at a corresponding arm portion 121 and is connected to a corresponding movable blade 122, and controls the expansion of the movable blade 122 according to the fluid flow direction and the position of the corresponding movable blade 122, or controls the closure of the movable blade 122 according to the fluid flow direction and the rotation angle of the corresponding movable blade 122.

Additionally, in this embodiment, each drive unit 23 includes a rotaty device 231 and two rotary rods 232, each rotaty device 231 is disposed at each arm portion 121, and the rotary rods 232 are connected to the rotaty device 231, and the rotary rods 232 can drive the movable blade. In this embodiment, the rotary rods 232 are connected to the movable blade. Preferably, the rotaty device 231 of each drive unit 23 includes a motor 2311 and two gears 2312, where the motor 2311 can drive one of the gears 2312, the gears 2312 are engaged with each other, and the rotary rods 232 of each drive unit 231 are connected to the gears 2312.

When the motor 2311 drives one of the gears 2312, the rotation directions of the gears 2312 are opposite (one gear rotates clockwise, and the other gear rotates counterclockwise), so as to drive the rotary rods 232 to rotate respectively in a corresponding direction, thereby driving the movable blade to be expanded or closed. As shown in FIG. 6, the expansion angle of the movable blades 122 is approximately 180 degrees. Additionally, as shown in FIG. 7, the movable blades 122 are in a gradually closed state.

Figure 8:
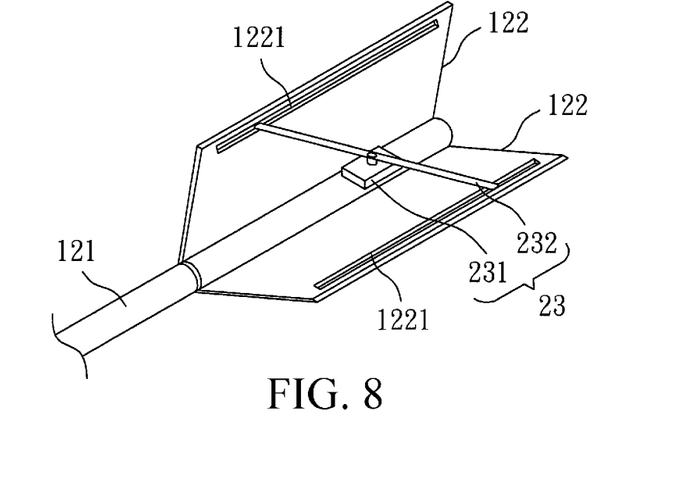
FIG. 8 and FIG. 9 are schematic diagrams of a blade unit equipped with a drive unit according to another embodiment of the present invention.
Figure 9:
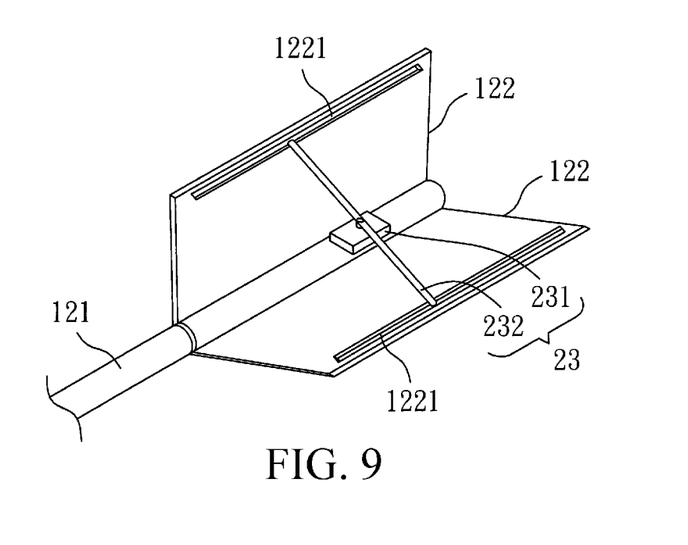

FIG. 8 and FIG. 9 are schematic diagrams of a blade unit equipped with a drive unit according to another embodiment of the present invention. Referring to FIG. 8 and FIG. 9, in another embodiment, each drive unit 23 can be fixed on a corresponding arm portion 121 and be located between two movable blades 122. According to the embodiment shown in FIG. 8 and FIG. 9, each movable blade 122 has a chute 1221, and each drive unit 23 includes a rotaty device 231 and a rotary rod 232. The rotaty device 231 is fixed on a corresponding arm portion 121 and is substantially connected to a middle part of the rotary rod 232, and two ends of the rotary rod 232 are movably disposed in the chutes 1221 of the two movable blades 122.

The rotaty device 231 drives the rotary rod 232 to rotate, and when the rotary rod 232 begins to rotate to 90 degrees, two ends of the rotary rod 232 slide along the chutes 1221 to push the movable blades 122 outwards, thereby expanding the movable blades 122 (as shown in FIG. 9); when the rotary rod 232 rotates reversely, the rotary rod 232 sliding along the chutes 1221 draws the movable blades 122 inwards, thereby closing the movable blades 122 (as shown in FIG. 8).

Referring to FIG. 1, FIG. 6 and FIG. 7, the sensing unit 22 can be further used to measure a deflection angle of the fluid flow direction (that is angle difference of different fluid flow directions measured at different time points). Each drive unit 23 can control the expansion of the movable blade 122 according to the fluid flow direction, the deflection angle of the fluid flow direction and the position of the corresponding movable blade 122, or control the closure of the movable blade 122 according to the fluid flow direction, the deflection angle of the fluid flow direction and the rotation angle of the corresponding movable blade 122.

For example, the deflection angle of the fluid flow direction is 5 degrees, and the movable blade 122 can be controlled to be expanded at a delay of at least 5 degrees after passing through the first radial centre line 19. Preferably, it is further considered to add a safety angle, for example, the deflection angle of the fluid flow direction is 5 degrees and the safety angle is 2 degrees, and the movable blade 122 can be controlled to be expanded at a delay of 7 degrees, so as to avoid occurrence of interference of the movable blade 122 after expansion and the adjacent blade unit (for example, the blade unit 13).

Referring to FIG. 1 again, as for the blade units 12-17 rotating reversely around the shaft column 11, the expanded movable blades 122-172 form an almost continuous fluid-receiving region at two sides of the shaft column 11, thus significantly increasing the fluid-receiving region, and maximizing the use of energy in the fluid. Compared with a conventional power generation device (for example a wind power generation device) that merely has a fluid-receiving region at one side, the power generation device 1 of the present invention can improve the power generation efficiency by several times in compulsion with the conventional power generation device.

During operation of the power generation device 1 of the present invention, the expanded movable blades 122-172 block the fluid and rotate, and the rotation power can be directly or indirectly transferred to a load device (not shown), so that the load device is enabled to rotate to work, so as to complete the fluid power generation process. It can be understood that, the load device not only can be used for power generation, and but also can be used for conversion of mechanical energy or energy in any other forms.

The power transfer manner can be that a power output device (for example, power transfer belt) is connected to the magnetic shaft sleeves M of the blade units 12-17 and the load device, and the power output device indirectly transfers the power to the load device. It can be understood that, the power transfer manner and the electric power transfer manner may be any suitable manner, but not limited to the manner described above.

Figure 10:
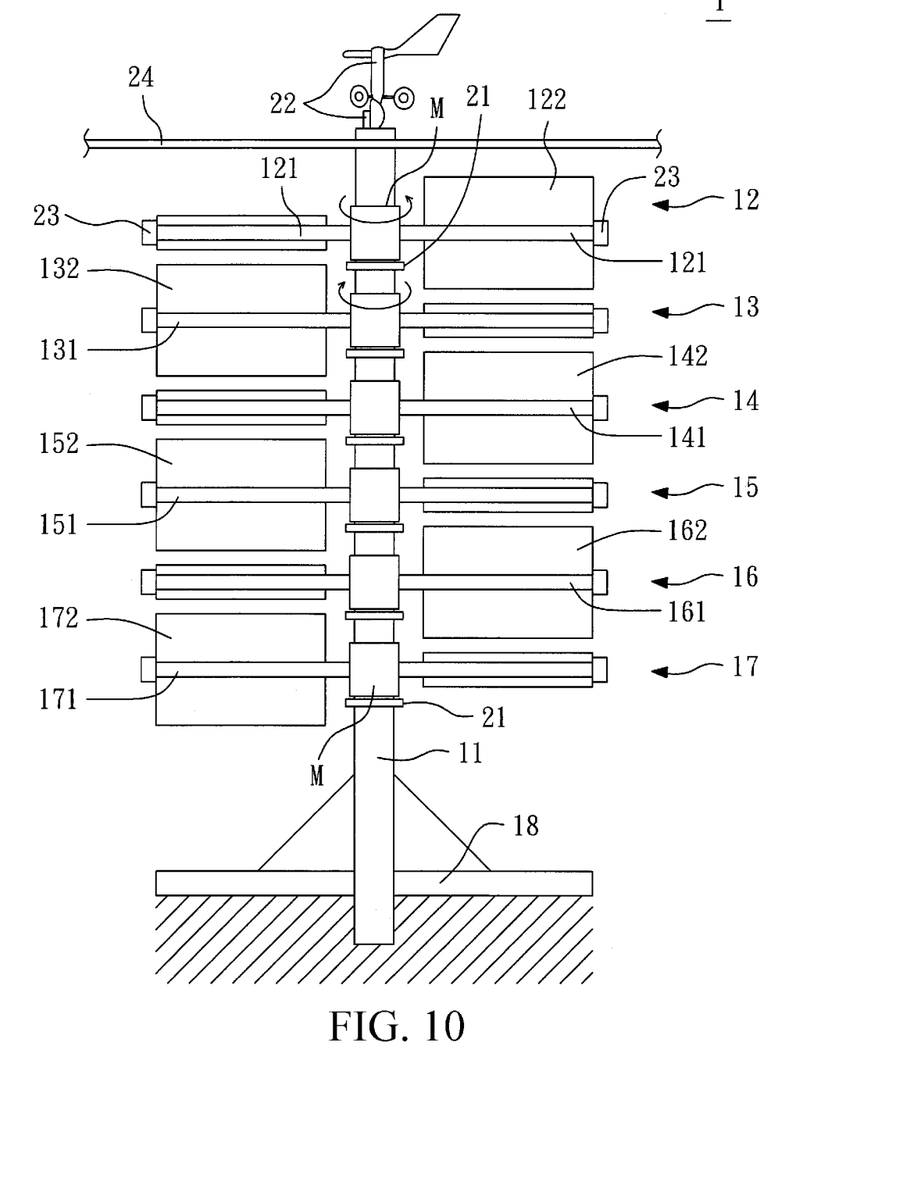
FIG. 10 is a schematic diagram of a power generation device according to another embodiment of the present invention.

It can be understood that, the power generation device 1 of the present invention can further include at least one solar panel 24, where the solar panel 24 can be disposed at the top of the shaft column 11 (as shown in FIG. 10). The solar panel 24 can be substantially parallel to the ground. It can be understood that, the solar panel 24 can be preferably adjusted according to the direction of sunlight, so that a light-receiving surface of the solar panel 24 can be perpendicular to the direction of sunlight as far as possible, so as to obtain the maximum sunlight energy, thereby generating the maximum electric power.

In this way, the power generation device 1 of the present invention can maximize the use of energy in the fluid to obtain improved power generation efficiency, and at the same time, can utilize the solar panel 24 to convert sunlight into electric power, thereby increasing the total amount of the generated electric power.

While several embodiments of the present invention have been illustrated and described, various modifications and improvements can be made by those skilled in the art. The embodiments of the present invention are therefore described in an illustrative but not restrictive sense. It is intended that the present invention should not be limited to the particular forms as illustrated, and that all modifications which maintain the spirit and scope of the present invention are within the scope defined in the appended claims.

What is claimed is:

1. A power generation device, comprising:
a shaft column;
at least two blade units sheathed onto the shaft column and capable of rotating around the shaft column, the adjacent blade units rotate in opposite rotational directions, each blade unit has a plurality of arm portions and a plurality of movable blades, the arm portions extend radially outwardly from the shaft column, each of the movable blades is connected to one side of the corresponding arm portion and, after passing through a first radial centre line of the shaft column, expands gradually, and after being expanded, does not interfere with the adjacent blade unit, the first radial centre line is parallel to a fluid flow direction, and each of the movable blades is gradually closed after it rotates through a rotation angle; and
a plurality of magnetic components, each blade unit has a magnetic shaft sleeve, the magnetic shaft sleeves are sheathed onto the shaft column at intervals, one end of the arm portion of each blade unit is fixed on the magnetic shaft sleeve, and each magnetic component is disposed between the magnetic shaft sleeves.

2. The power generation device of claim 1, wherein when the arm portions where a movable blade of each blade unit and the adjacent movable blade are located are symmetric to a second radial centre line of the shaft column, the movable blade is closed, and the second radial centre line is perpendicular to the first radial centre line.

3. The power generation device of claim 1, further comprising at least one sensing unit disposed on the shaft column for measuring the fluid flow direction, the fluid flow rate and the position of the movable blade.

4. The power generation device of claim 3, further comprising a plurality of drive units, wherein each drive unit is disposed at a corresponding arm portion, and controls the expansion of the movable blade according to the fluid flow direction and the position of the movable blade, or controls the closure of the movable blade according to the fluid flow direction and the rotation angle of each movable blade.

5. The power generation device of claim 4, wherein each drive unit includes a rotaty device and at least one rotary rod, each rotaty device is disposed at each arm portion, and the rotary rod is connected to the rotaty device, and the rotary rods can drive the movable blade.

6. The power generation device of claim 5, wherein the rotaty device of each drive unit includes a motor and two gears, where the motor can drive one of the gears, the gears are engaged with each other, and the rotary rods of each drive unit are connected to the gears.

7. The power generation device of claim 3, wherein the sensing unit is further used to measure a deflection angle of the fluid flow direction.

8. The power generation device of claim 7, further comprising a plurality of drive units, wherein each drive unit is disposed at a corresponding arm portion, and controls the expansion of the movable blade according to the fluid flow direction, the deflection angle of the fluid flow direction and the position of the movable blade, or controls the closure of the movable blade according to the fluid flow direction, the deflection angle of the fluid flow direction and the rotation angle of each movable blade.

9. The power generation device of claim 8, wherein each drive unit includes a rotaty device and at least one rotary rod, each rotaty device is disposed at each arm portion, and the rotary rod is connected to the rotaty device, and the rotary rods can drive the movable blade.

10. The power generation device of claim 9, wherein the rotaty device of each drive unit includes a motor and two gears, where the motor can drive one of the gears, the gears are engaged with each other, and the rotary rods of each drive unit are connected to the gears.

11. The power generation device of claim 1, wherein the magnetic components have the magnetism the same as that of the magnetic shaft sleeves.

* * * * *